United States Patent
Kumita et al.

(10) Patent No.: US 12,230,099 B2
(45) Date of Patent: Feb. 18, 2025

(54) INFORMATION PROCESSING SYSTEM AND GAME MANAGEMENT PROGRAM

(71) Applicant: Universal Entertainment Corporation, Tokyo (JP)

(72) Inventors: Atsushi Kumita, Tokyo (JP); Toshikazu Jinnouchi, Tokyo (JP); Muneki Shiraishi, Tokyo (JP); Satoko Baba, Tokyo (JP); Nobuyuki Kawarai, Tokyo (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 119 days.

(21) Appl. No.: 17/798,622

(22) PCT Filed: Jan. 22, 2021

(86) PCT No.: PCT/JP2021/002218
§ 371 (c)(1),
(2) Date: Aug. 10, 2022

(87) PCT Pub. No.: WO2021/166551
PCT Pub. Date: Aug. 26, 2021

(65) Prior Publication Data
US 2023/0088120 A1 Mar. 23, 2023

(30) Foreign Application Priority Data
Feb. 19, 2020 (JP) ................................. 2020-026582

(51) Int. Cl.
*G07F 17/32* (2006.01)
(52) U.S. Cl.
CPC ...... *G07F 17/3227* (2013.01); *G07F 17/3267* (2013.01)

(58) Field of Classification Search
None
See application file for complete search history.

(56) References Cited

U.S. PATENT DOCUMENTS

| | | | | |
|---|---|---|---|---|
| 8,794,508 B1 * | 8/2014 | Pascal | ............ | H04W 4/21 235/375 |
| 2003/0134679 A1 * | 7/2003 | Siegel | ............ | A63F 13/55 463/43 |

(Continued)

FOREIGN PATENT DOCUMENTS

JP 2019-093032 6/2019

*Primary Examiner* — Jason T Yen
(74) *Attorney, Agent, or Firm* — LEX IP MEISTER, PLLC

(57) ABSTRACT

The present invention provides an information processing system and a game management program that can improve a game continuation rate in a game in which any one of a plurality of game contents is executable by satisfying a predetermined condition. The information processing system includes: an information processing device in which any one of a plurality of game contents is executable by satisfying a predetermined condition; and a server communicably connected to the information processing device and configured to manage the game content executed in the information processing device, in which the server includes a control unit configured to perform control, based on information transmitted from the information processing device, such that any one of the plurality of game contents is executable in the information processing device that is a transmission source of the information.

2 Claims, 11 Drawing Sheets

(56) References Cited

U.S. PATENT DOCUMENTS

| | | | |
|---|---|---|---|
| 2013/0237304 A1* | 9/2013 | Oakes | G07F 17/32 |
| | | | 463/16 |
| 2013/0252686 A1* | 9/2013 | ONeill | G07F 17/3237 |
| | | | 463/16 |
| 2014/0274318 A1* | 9/2014 | Bronshteyn | G07F 17/3255 |
| | | | 463/25 |
| 2019/0160375 A1* | 5/2019 | Okada | A63F 13/67 |

* cited by examiner

FIG. 5

| USER ID | RELEASED MODEL | COUNT OF COINS |
|---|---|---|
| 00001 | A、B | 1, 000, 000 |
| 00002 | A | 200, 000 |
| 00003 | A、B、C | 15, 000, 000 |
| ⋮ | ⋮ | ⋮ |

INFORMATION PROCESSING SYSTEM AND GAME MANAGEMENT PROGRAM

TECHNICAL FIELD

The present invention relates to an information processing system and a game management program.

BACKGROUND ART

In recent years, in social games (server management) using smartphones in which a game application is installed, a game progresses by a player operating an operation panel or a touch panel of the smartphone.

In such a game, a plurality of kinds of contents (for example, slot games) are included in the game, and when a predetermined condition is satisfied in the game, the game can be played in a new content, which encourages a player to continue playing the game.

For example, PTL 1 discloses one in which a game including a plurality of game contents with different difficulty levels can be executed, and which is configured to be playable in a new game content based on position information of a real space of a terminal device acquired from the terminal device used by a player (see PTL 1).

In such a game, motivation of the player to continue playing the game can be improved by configuring the game such that the new game content can be played when a predetermined condition of the position information is satisfied.

CITATION LIST

Patent Literature

PTL 1: US Patent Application Publication No. 2019/0160375 specification

SUMMARY OF INVENTION

Technical Problem

When a game exhibition is held, at an exhibition hall, as a privilege for a visitor, an operator sets and provides all game contents in a manner of being immediately playable without a restriction by using a terminal device such as a smartphone installed in the hall even for a game content that should be played sequentially according to progress of the game. The visitor can find his/her favorite game content by playing the provided game contents by using the terminal device installed in the hall.

However, regarding released game contents that can be played sequentially according to the progress of the game in the game progressing sequentially, even though the visitor finds his/her favorite game content at the exhibition, when an application of the game is downloaded to a portable terminal device of the visitor for the first time or when the visitor has already downloaded the application of the game to the portable terminal device of the visitor but has not progressed the game, there is a possibility that a target game content cannot be played immediately by using the portable terminal device of the visitor, and the game cannot be played continuously.

An object of the present invention is to provide an information processing system and a game management program that can improve a game continuation rate in a game in which any one of a plurality of game contents is executable by satisfying a predetermined condition.

Solution to Problems

An information processing system according to the present invention includes:
  an information processing device in which any one of a plurality of game contents (slot games) is executable by satisfying a predetermined condition; and
  a server communicably connected to the information processing device and configured to manage the game content executed in the information processing device, in which
  the server includes a control unit configured to perform control, based on information (for example, access information) transmitted from the information processing device, such that any one of the plurality of game contents is executable in the information processing device that is a transmission source of the information.

In the above configuration, when the information is transmitted from the information processing device, by performing control such that any game content is executable in the information processing device that is a transmission source of the information, a player playing the game by using the information processing device can be provided with an opportunity to play the game content immediately regardless of whether the player satisfies a predetermined condition. Accordingly, a game continuation rate can be improved.

In addition, the information processing system according to the present invention is the above information processing system, in which
  when all of the plurality of game contents are executable, the server performs control such that an item used to progress the game contents is available in the information processing device that is the transmission source, instead of performing control such that any one of the game contents is executable.

In the above configuration, when all of the game contents have already been executable, by performing control such that the item used to progress the game is available in the information processing device, the player can be provided with an opportunity to continue the game. Accordingly, the game continuation rate can be improved.

Further, the present invention relates to a game management program executed by a server communicably connected to an information processing device in which any one of a plurality of game contents is executable, and configured to manage the game content executed in the information processing device, the game management program executing
  a) a process of receiving information transmitted from the information processing device, and
  b) a process of performing control, based on the information, such that any one of the plurality of game contents is executable in the information processing device that is a transmission source of the information.

Advantageous Effects of Invention

According to the present invention, it is possible to provide an information processing system and a game management program that can improve a game continuation rate in a game in which any one of a plurality of game contents is executable by satisfying a predetermined condition.

BRIEF DESCRIPTION OF DRAWINGS

FIG. 5 is a diagram showing information stored in the server according to the embodiment of the present invention;

DESCRIPTION OF EMBODIMENTS

Embodiments

An information processing device according to the present embodiment will be described with reference to the drawings.

An information processing device 1 is connected to a server 10 via an Internet line 101 so as to be capable of data communication, and a game system 100 including the information processing device 1 and the server 10 is formed. It should be noted that the game system 100 is not limited thereto and may be formed only by the information processing device 1. Further, the information processing device 1 may mean a game system itself including a server and a terminal device such as a smartphone. Further, a function of the information processing device 1 described in the present embodiment may be a function of any of components of the game system.

A common application is installed in a plurality of information processing devices 1 via the server 10 or the like corresponding to an operating system (OS) of each information processing device 1. In the present embodiment, a slot game is playable as a game element in the application installed in the information processing device 1. That is, a player can play the slot game on this application. It should be noted that the slot game may be an add-in of the application. That is, the slot game may be provided as an additional function of the application by the server 10 or the like independently from the application. Further, in the application, a plurality of kinds of slot games having different effect modes and rules may be playable. It should be noted that the application may be a web browser.

Although details will be described later, the slot game is started on the premise of consumption of an accumulable game value. When a winning is achieved as a result of the slot game, a game value corresponding to a kind of the winning and the consumed game value is added to the accumulable game value as a payout. Thus, the information processing device 1 executes the slot game in which the accumulable game value is increased or decreased in accordance with a result. The game value may be information (game point) which is used exclusively for starting the slot game and does not have a monetary value or may be electronic valuable information having a monetary value.

Figure 1:
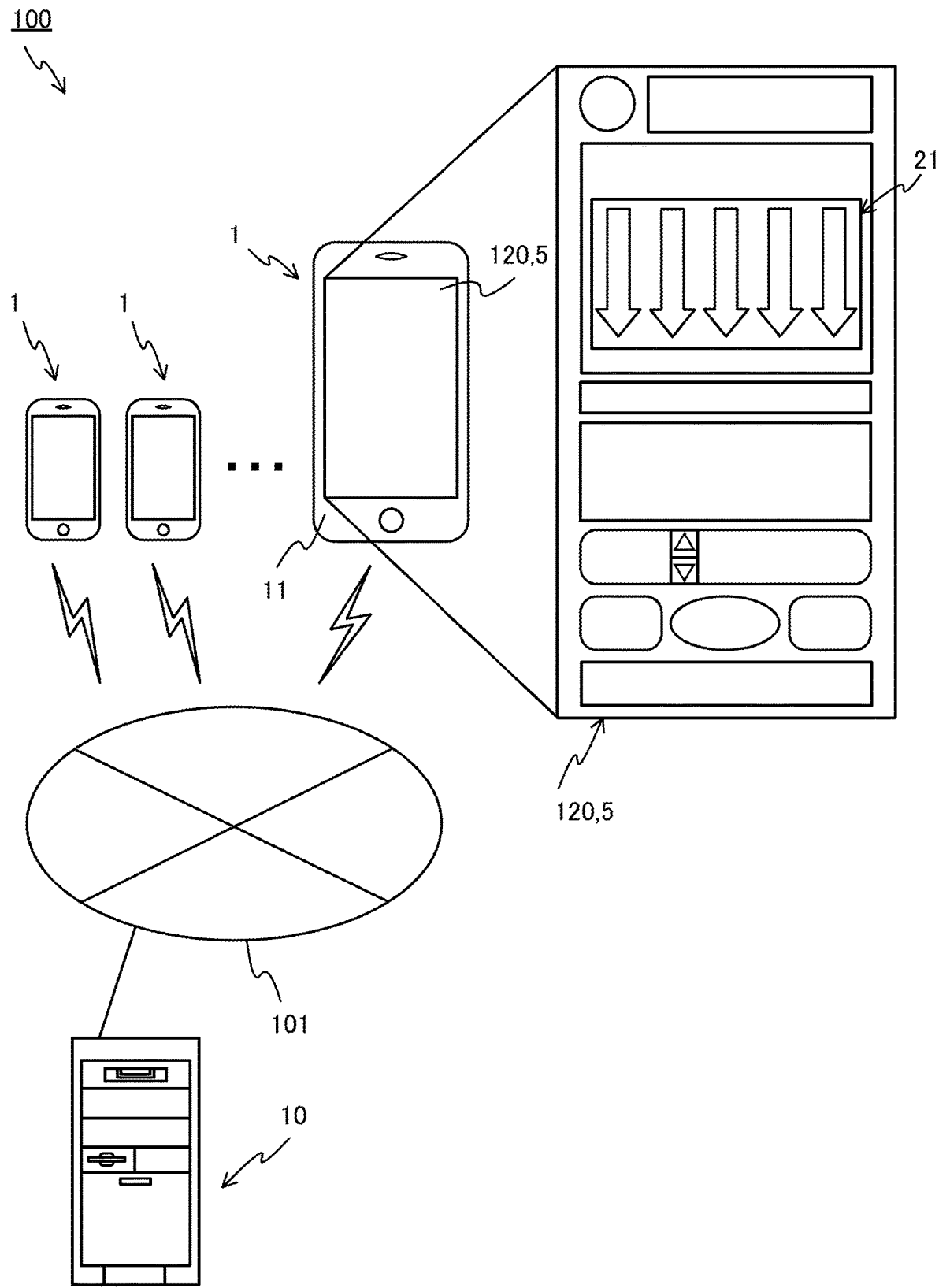
FIG. 1 is a block diagram showing a game system according to an embodiment of the present invention.

As shown in FIG. 1, the information processing device 1 exemplified in the present embodiment is a so-called smartphone, and includes a display 120 provided on a front surface of a housing 11 and a touch panel 5 provided on the entire surface of the display 120. The display 120 is provided with a symbol display area 21 in which variable display and stop display of a symbol are performed when the game is started.

In the present embodiment, the information processing device 1 is exemplified as a smartphone, but the information processing device 1 may be a portable device or a stationary device. Examples of the portable information processing device 1 include portable information devices such as a portable computer, a laptop computer, a tablet personal computer, a handheld personal computer, and a personal data assistant (PDA).

Figure 2:
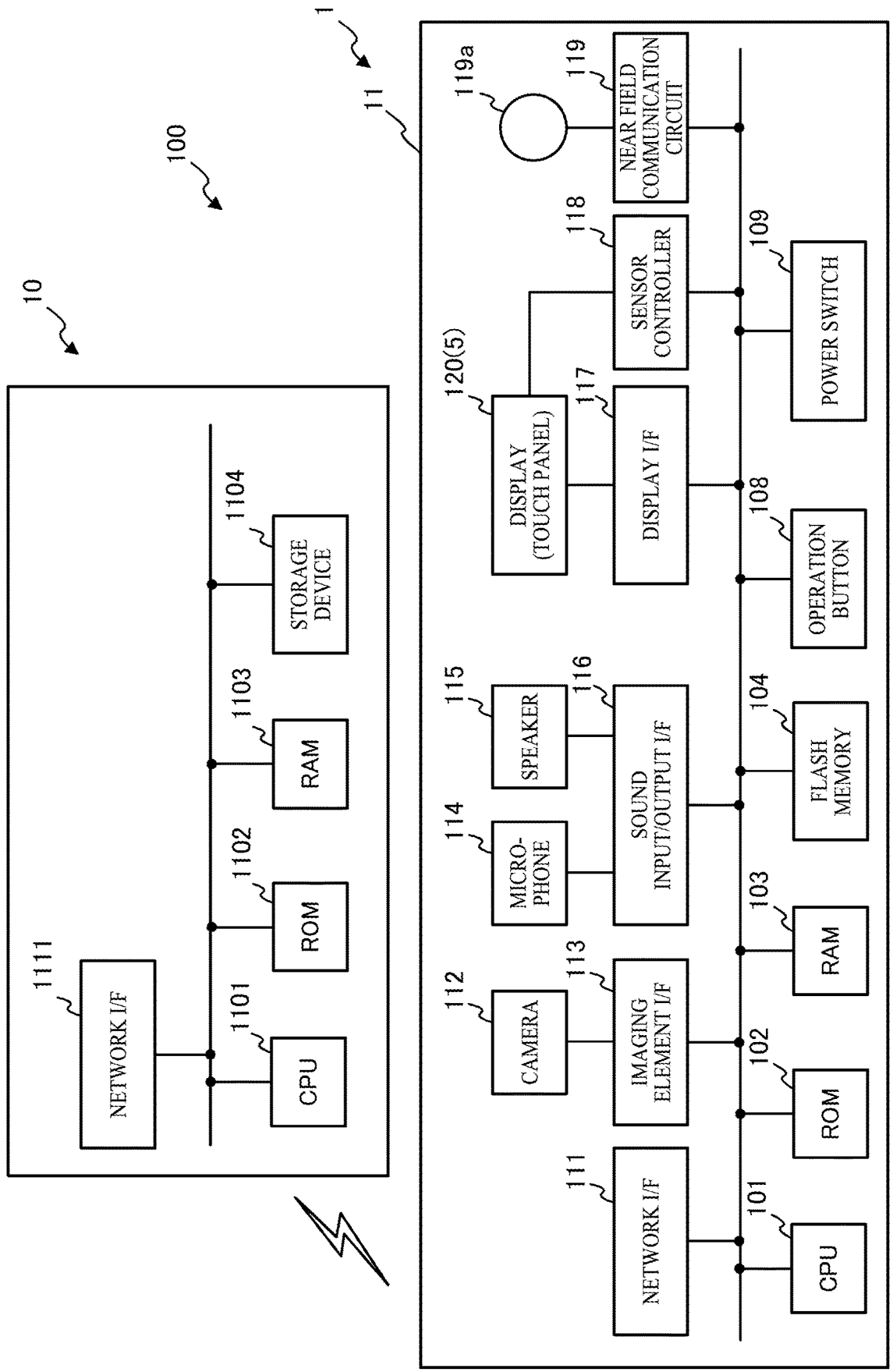
FIG. 2 is a block diagram showing a configuration of a smartphone (information processing device) and a server according to the embodiment of the present invention.

As shown in FIG. 2, the smartphone 1 includes, in the housing 11, a CPU 101, a ROM 102, a RAM 103, a flash memory 104, an operation button 108, a power switch 109, a bus line 110, a network I/F 111, a camera 112, an imaging element I/F 113, a microphone 114, a speaker 115, a sound input/output I/F 116, a display I/F 117, a sensor controller 118, a near field communication circuit 119, and an antenna 119a of the near field communication circuit 119. Further, the display 120 provided with the touch panel 5 (input unit) is incorporated on the front surface of the housing 11.

The display 120 is formed to be able to display an image. Examples of a display method of the display 120 include various display methods such as a liquid crystal method, an organic electroluminescence method, a cathode ray tube (CRT) method, and a plasma method.

The central processing unit (CPU) 101 controls an operation of the entire smartphone 1. The read only memory (ROM) 102 stores a program used for driving the CPU 101 such as an initial program loader (IPL).

The random access memory (RAM) 103 is used as a work area of the CPU 101. The flash memory 104 stores various data such as application software (program), a communication program, image data, and sound data for executing the game in the present embodiment. The operation button 108 is a button operated when the smartphone 1 is initially set. The power switch 109 is a switch for switching ON/OFF of a power of the smartphone 1.

The network interface (I/F) 111 is an interface for performing data communication with the server 10 or the like by using a communication network such as the Internet. The camera 112 is a kind of built-in type imaging unit that images a subject to obtain image data under the control of the CPU 101. The imaging element I/F 113 is a circuit that controls the drive of the camera 112. The microphone 114 is a kind of built-in type sound collection unit that inputs sound. The sound input/output I/F 116 is a circuit that processes input/output of a sound signal between the microphone 114 and the speaker 115 under the control of the CPU 101. The display I/F 117 is a circuit that transmits the image data to the display 120 under the control of the CPU 101. The sensor controller 118 is a circuit that receives input from the touch panel 5 provided on the display 120. The near field communication circuit 119 is a communication circuit such as near field communication (NFC) (registered trademark) and Bluetooth (registered trademark). The bus line 110 is an address bus or a data bus for electrically connecting components such as the CPU 101.

In addition, the server 10 is a so-called computer including a CPU 1101, a ROM 1102, a RAM 1103, a storage device 1104 such as a hard disk drive, and a network I/F 1111, and provides an application to the smartphone 1 and is used when a slot game administrator or the like operates and manages a social game service. The CPU 1101 functions as a main component of a controller in the server 10 and controls an operation of the entire server 10. The read only memory (ROM) 1102 stores a program used for driving the CPU 101 such as an initial program loader (IPL). The RAM 1103 is used as a work area of the CPU 1101. The storage device 1104 functions as a database and is a computer-readable non-transitory recording medium that stores game data for each of the plurality of information processing devices 1. The server 10 appropriately refers to the database of the storage device 1104 and returns a response to a request from a game program of the information processing device 1. The network I/F 1111 is an interface for performing data communication by using a communication network such as the Internet.

(Outline of Game Executed in Smartphone 1)

In the smartphone 1 having the above configuration, the CPU 101 is programmed to execute the application software of the game.

Figure 3:
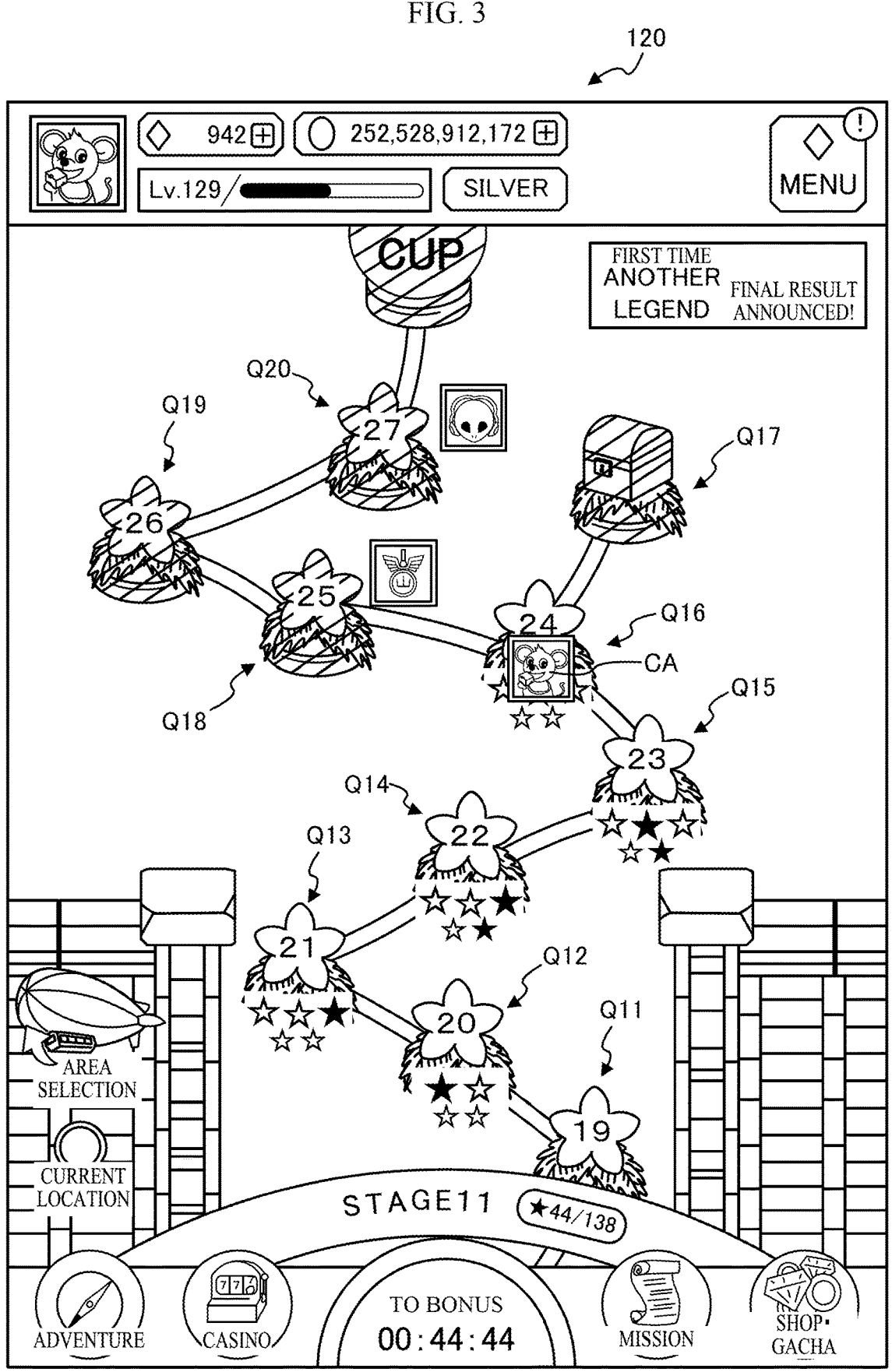
FIG. 3 is a schematic diagram showing a display content on a display of the smartphone according to the embodiment of the present invention.

When the application software of the game is executed in the smartphone 1, various game start effect images or the like are displayed, and then an image of "adventure mode" is displayed on the display 120 as shown in FIG. 3.

In the game provided in the present embodiment, a plurality of stages for executing the slot game are prepared. A plurality of quests are prepared for each stage. The player can execute a slot game in each quest, earn a payout from the slot game, and acquire an item for advantageously advancing the game.

As shown in FIG. 3, a map for executing the slot game is displayed for each stage on the display 120 of the smartphone 1. A plurality of quests Q11 to Q20 are set for each stage, and a slot game is prepared for each of the quests Q11 to Q20.

The player can set a character CA representing himself/herself, determine a destination of the character CA by operating the touch panel 5, and execute the slot game while sequentially advancing the character CA to the quests Q11 to Q20.

Figure 4:
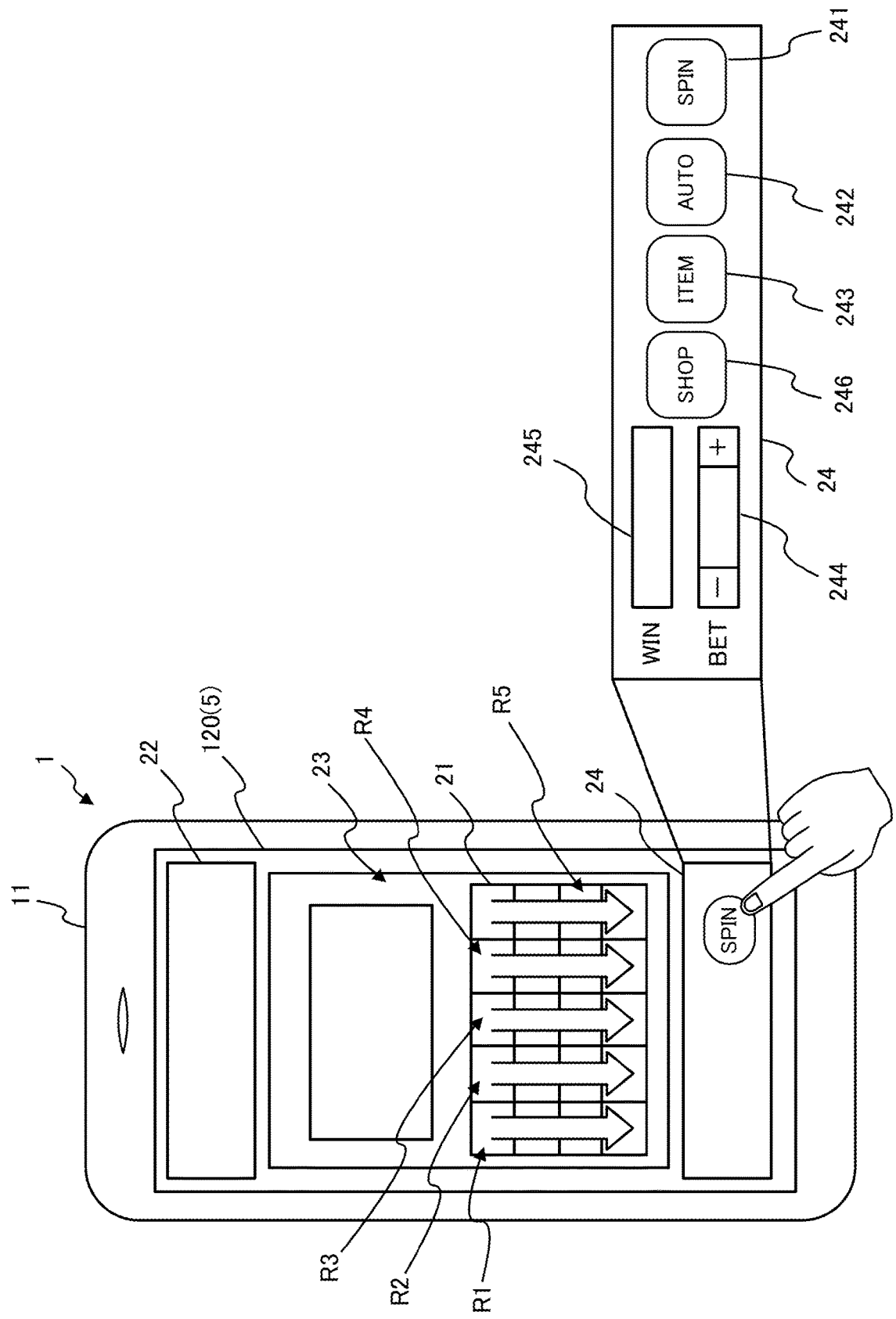
FIG. 4 is a diagram showing a display state of a slot game on the smartphone (information processing device) according to the embodiment of the present invention.

Specifically, when the player operates the character CA to advance the game to the first quest Q11, scroll screens of reels R1 to R5, which will be described later in FIG. 4, are displayed on the display 120 of the smartphone 1, whereby the slot game can be executed. A condition to be cleared is set for each of the quests Q11 to Q20. When the player executes a plurality of times of the slot game offered within a quest, the player can release a quest (for example, the quest Q12) following the quest (for example, the quest Q11) by clearing conditions set as a payout to be generated and the game count. When a new quest is released, the player can advance his/her character CA to the new quest (for example, the quest Q12) and challenge the new quest. A plurality of missions are prepared for each of the quests Q11 to Q20, and the player can also challenge each mission while playing the slot game in the quest. The mission count completed in each quest is one of conditions for clearing the stage.

In addition, by clearing a specific quest prepared for each stage, for example, the player can move from a stage of the quest Q19 to a stage of the next quest Q20, and can challenge the next quest, and when the player shifts to a casino mode by touching a part displayed as "casino" shown in FIG. 3, in the casino mode, a privilege such as releasing any of a plurality of kinds of prepared slot games to a playable state is given. That is, the player can enjoy next game start by clearing the specific quest in the adventure mode, whereby the player can enjoy a sense of accomplishment and it may evoke a desire to continue playing.

(Outline of Slot Game)

The slot game (game content) selected in each of the quests Q11 to Q20 in the adventure mode or in the casino mode is playable by the player as a game element in the application installed on the smartphone 1. In the application installed on the smartphone 1, when there is a request from the smartphone 1, a slot game, in which a plurality of symbols are rearranged in the symbol display area 21 including 20 areas in a matrix of 5 columns×4 rows as shown in FIG. 4, for example, can be executed.

A plurality of models of the slot game that can be executed in the casino mode are prepared, and by clearing a predetermined condition in the adventure mode, a model corresponding to the condition clearing is released and can be played.

When the slot game in the present embodiment is started, and basically, a predetermined amount of coin (game medium) possessed by the player is consumed, the slot game can be started. It should be noted that when a predetermined condition is satisfied, the slot game can be started without consuming the coin (for example, when a condition for awarding a free game is satisfied).

The coin possessed by the player is electronic information, and the player can access the server 10 from the smartphone 1 and exchange a credit for the coin according to a payment method specified by a slot game operating organization. The coin possessed by the player is used in a wide variety of ways such as being consumed as an equivalent (purchase of an item) for obtaining an effect that influences the slot game, or being consumed as an equivalent for changing an appearance of a character that represents the player.

It should be noted that the game medium is not particularly limited, and may be electronic money or a game point that does not include valuable information.

The server 10 stores, in the storage device 1104 (FIG. 2), a game status of each player specified by a user ID (for example, released model information specifying a released model, and the count of coins possessed), and the server 10 updates information about the game status of the player by transmitting a result of the game executed in the smartphone 1 from the smartphone 1 to the server 10.

For example, as shown in FIG. 5, released model information representing a released model, information about the count of coins possessed, or the like corresponding to the user ID are stored in the storage device 1104 of the server 10 as a user management table. In an example shown in FIG. 5, for example, in association with a player (user) to which a user ID of "00001" is assigned, information that the released model is model A and model B, and the count of coins owned by the player is "1,000,000" is stored. It should be noted that player information stored in the server 10 is not limited thereto, and for example, possession information or the like of an item that can be used in the game (for example, an item for advantageously advancing the game) is also stored. The information is updated each time when the information is transmitted from the smartphone 1.

(Game Control Process)

Figure 6:
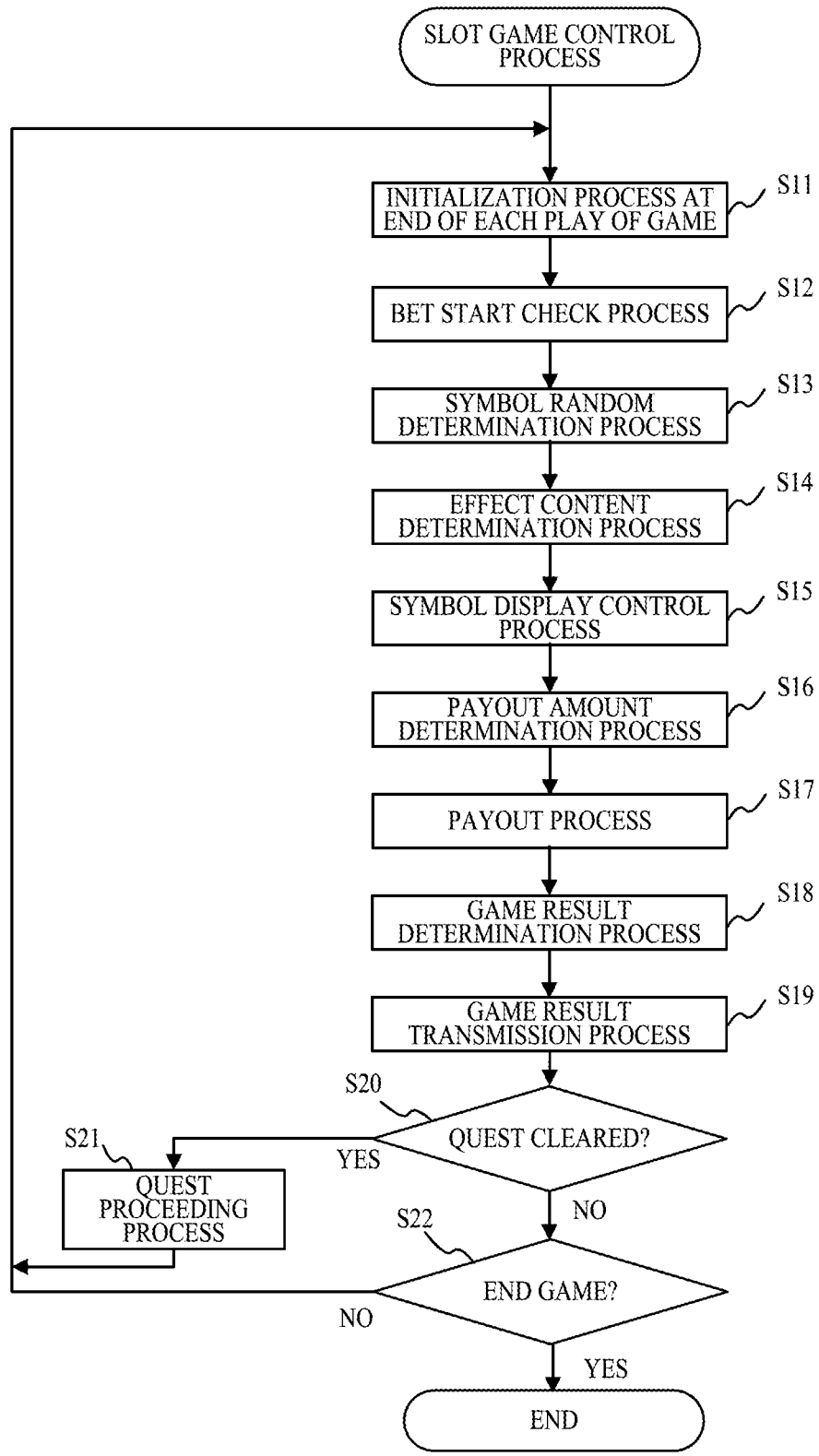
FIG. 6 is a flowchart showing a slot game process procedure according to the embodiment of the present invention.

The game control process executed by the smartphone 1 will be described with reference to FIG. 6.

First, in order to start the slot game, the CPU 101 causes the process to proceed to an initialization process at the end of each play of the game (S11). In the initialization process at the end of each play of the game (S11), the CPU 101 clears, for each unit game in a work area of the RAM 103, unnecessary data such as a payline valid in a previous unit game, a value of a bet counter in a BET count storage area, and a symbol determined to be displayed on the symbol display area 21 by random determination.

Next, the CPU 101 performs a bet start check process (S12). In this bet start check process, a valid payline is determined. Then, the count of coins bet on the valid payline validated by the player is determined by input check such as an operation of touching a "+" button and a "−" button (see FIG. 4) of a bet button 244 on an operation display area 24 of the display 120 of the smartphone 1. Then, the count of bet coins corresponding to the valid payline is stored in a BET counter of the RAM 103. Thus, when a winning is achieved in the slot game by determining the valid payline and the count of bet coins, a value obtained by multiplying a payout corresponding to a winning (symbol arrangement pattern) achieved on the valid payline by the count of bet coins is a payout in the winning. In addition, in this bet start check process, the CPU 101 determines whether a touch operation on the spin button 241 is performed, and when the touch operation on the spin button 241 is performed, the CPU 101 proceeds to a process of S13 and progresses the slot game.

Next, the CPU 101 performs a symbol random determination process (S13). Here, to-be stopped symbols are determined by random determination from a plurality of symbols arranged in the video reels (R1, R2, R3, R4, and R5) shown in FIG. 4. The to-be stopped symbols are data of five symbols displayed on lower center stages of columns on the symbol display area 21 among a plurality of symbols forming the video reels. Accordingly, 20 symbols to be displayed on the symbol display area 21 are determined.

Then, the CPU 101 stores the determined five to-be stopped symbols in a symbol storage area provided in the RAM 103.

Next, the CPU 101 performs an effect content determination process (S14). The CPU 101 extracts an effect random number value and determines, by random determination, one of a plurality of predetermined effect contents.

Next, the CPU 101 performs a symbol display control process (S15). In this symbol display control process, scrolling of the symbol columns of the video reels R1 to R5 is started, and after a predetermined period of time, the five to-be stopped symbols determined in the symbol random determination process of S13 are sequentially rearranged in the lower center stages of the columns 1 to 5 in the symbol display area 21. That is, 20 symbols including the to-be stopped symbols are rearranged in the symbol display area 21.

Next, the CPU 101 performs a payout amount determination process (S16). In this process, based on symbol combination data of the slot game stored in the RAM 103, an amount of payout or a privilege is determined. The determined payout or privilege is stored in a payout amount storage area provided in the RAM 103.

Next, the CPU 101 performs a payout process (S17). The CPU 101 adds the value stored in the payout amount storage area of the RAM 103 to a value in a coin counter provided in the RAM 103. For example, in the payout amount determination process of S16, the value stored in the payout amount storage area is added to the value in the coin counter.

Next, the CPU 101 determines, based on a game result, whether the amount of payout or the quest clear condition (for example, a total amount of payouts awarded in the quest) is satisfied (S18), and transmits the determination result to the server 10 as game result information (S19). By receiving the game result information transmitted from the smartphone 1, the server 10 updates information (FIG. 5) associated with the player specified by the user ID. It should be noted that the information transmitted to the server 10 as the game result information is not limited thereto, and for example, information such as a game item acquired by the player in the game is also transmitted.

The CPU 101 determines, based on the determination result of S18, whether to end the game when the quest clear condition is not satisfied (NO in S20) (S22). When a determination result of ending the game is obtained (YES in S22), this may be due to, for example, that the player performs an operation to end the game, and the CPU 101 ends the process after storing the data. On the other hand, when the determination result of ending the game is not obtained (NO in S22), the CPU 101 proceeds to the process of S11. On the other hand, when the quest clear condition is satisfied (YES in S20), the CPU 101 ends the process of the quest and executes a process of proceeding to a next quest (such as a process of releasing the next quest) (S21), and then proceeds to the process of S11.

(Visit Privilege)

In a game exhibition held for the purpose of disseminating a new game and developing a new fan group, the game is intended to be popularized by giving a visitor a privilege and improving the interest thereof in the game.

The privilege given to the visitor includes a privilege to immediately release a slot game model that is released when a predetermined condition is cleared in the game. By obtaining the privilege, the visitor can immediately play, with the privilege, a model that cannot be played unless the game is advanced and a certain condition is cleared.

Accordingly, for a player who has downloaded the game application to his/her smartphone 1 for the first time, or a player who has already downloaded the game application and plays the game a little, by releasing an unreleased model and letting the player play the model, the interest thereof in the game can be improved.

Figure 7:
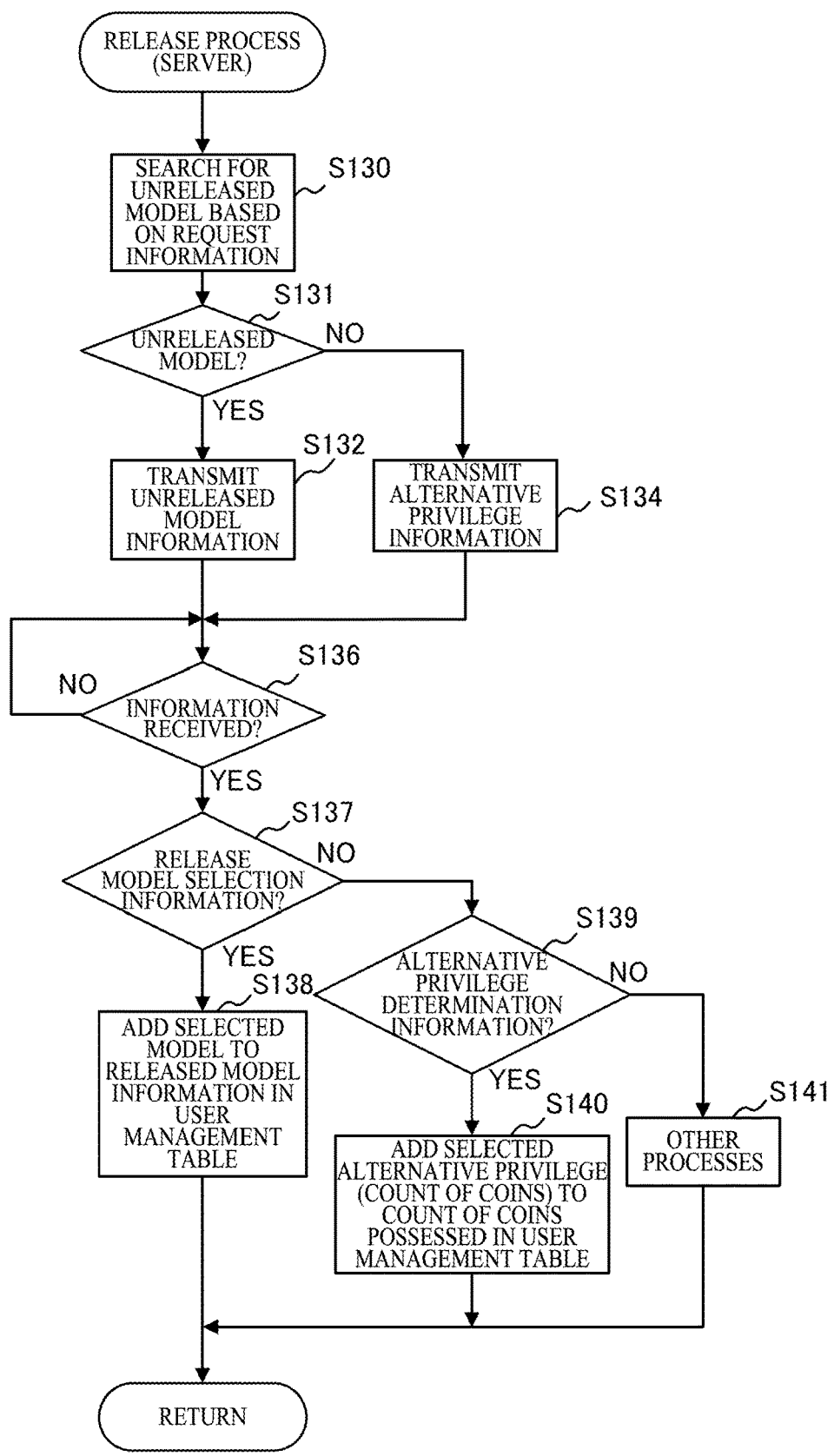
FIG. 7 is a flowchart showing a release process procedure for an unreleased model in the server according to the embodiment of the present invention.

FIG. 7 is a flowchart showing a process procedure in the server 10 in a case of releasing an unreleased model as a visit privilege.

At reception of the game exhibition, a two-dimensional bar code for accessing a model release page provided by the server 10 is printed on a pamphlet or the like and given to the visitor, and the visitor images the two-dimensional bar code by the smartphone 1 and accesses the model release page.

It should be noted that in the present embodiment, the two-dimensional bar code is exemplified, but the present invention is not limited thereto, a one-dimensional bar code may be used, and any information provision form capable of providing access information that enables access to the model release page in a form that can be loaded into a game playable terminal such as a smartphone can be used.

The server 10 specifies a player who will receive the privilege from the access information to the model release page from the smartphone 1 and the user ID transmitted together with the access information, based on the user ID. Then, the unreleased model corresponding to the user ID stored in the storage device 1104 is searched for (S130).

Specifically, as shown in FIG. 5, a released model corresponding to the user ID is stored in the storage device 1104 of the server 10. For example, the released models A and B are stored in association with the player to which the user ID of "00001" is assigned. By referring to the information stored in the storage device 1104, the server 10 can determine the released model corresponding to the user ID transmitted from the smartphone 1 (S130).

Depending on the player, the game may have already been progressed, and as a result, all prepared models may have been released. On the other hand, for a player who is new to the game or a player who has just downloaded the game application, although all models prepared for release are unreleased models and a selection range is wide, since a condition for releasing the model has not been cleared yet, a model for release cannot be released and played immediately. In contrast, a player who sufficiently advances the game may have already released all release models.

Depending on such situations of the player, in a privilege giving process in the present embodiment, when there are unreleased models for the player, any one of the models is released as a privilege, and when all the models have been released and there is no new model to be released, an alternative privilege is given instead of releasing a model as the privilege. As the alternative privilege, an item necessary for continuing the game is given. For example, by giving a coin necessary for playing the game, other items for advantageously advancing the game, etc. as the privilege, a possibility of the player continuing the game is increased since the privilege is used in subsequent games.

The server 10 specifies the unreleased model corresponding to the user ID by the process of S130, and determines whether there is an unreleased model (S131). When there is an unreleased model (YES in S131), information about the unreleased model is transmitted to the smartphone 1 which is a transmission source of the user ID (S132). For example, when a model prepared for release includes 20 models from model A to model T, assuming that the released model for the player specified by the user ID of "00001" includes two models of model A and model B, since the remaining 18 models of model C to model T are unreleased models, information about these 18 models (unreleased model information) is transmitted to the smartphone 1.

On the other hand, when there is no unreleased model (NO in S131), the server 10 transmits information about the alternative privilege (alternative privilege information) to the smartphone 1 which is the transmission source of the user ID (S134).

In addition, the server 10 determines whether the information has been received from the smartphone 1 (S136), and when the information is received (YES in S136), the server 10 determines whether the received information is release model selection information (S137). When the received information is the release model selection information (YES in S137), a selected model is added to the released model information in the user management table (FIG. 5) of the storage device 1104 (S138). Specifically, for example, when the model C, which is an unreleased model so far, is released as a privilege for the player having the user ID of "00001", the model C is added to the released model corresponding to the user ID of "00001".

Thus, by adding the unreleased model selected as the privilege to the user management table (FIG. 5) as the released model information, when the player then operates the smartphone 1 to open a casino mode model list (FIG. 9 and FIG. 10) from the game application, a key mark K of the release model disappears, and when the model is tapped, game data of the model is downloaded from the server 10.

On the other hand, when the received information is not the release model selection information (NO in S137), the server 10 determines whether the received information is alternative privilege determination information (S139), and when the received information is the alternative privilege determination information (YES in S139), the determined alternative privilege (for example, a predetermined count of coins) is added to the information about the count of coins possessed in the user management table (FIG. 5) of the storage device 1104 (S140). Thus, by adding the count of coins selected as the privilege to the information about the count of coins possessed in the user management table (FIG. 5), when the player then operates the smartphone 1 to start the game from the game application, the count of coins possessed is displayed as a count obtained by adding the count of coins given as the privilege.

On the other hand, when it is determined that the information transmitted from the server 10 is not the alternative privilege determination information (NO in S139), this means that the information received from the smartphone 1 is neither the release model selection information nor the alternative privilege determination information, and the server 10 executes other processes according to the received information (S141).

It should be noted that the server 10 stores that the visit privilege has been given in response to the transmission of release data or alternative privilege data to the smartphone 1 (S138, S140). Accordingly, for example, it is possible to prevent the privilege from being given for the same user ID a plurality of times on the same day. Further, for example, providing different privileges to the same user ID on a daily basis at the game exhibition can be an opportunity for the player to visit the hall over a plurality of days.

(Display of Display 120)

Figure 8:
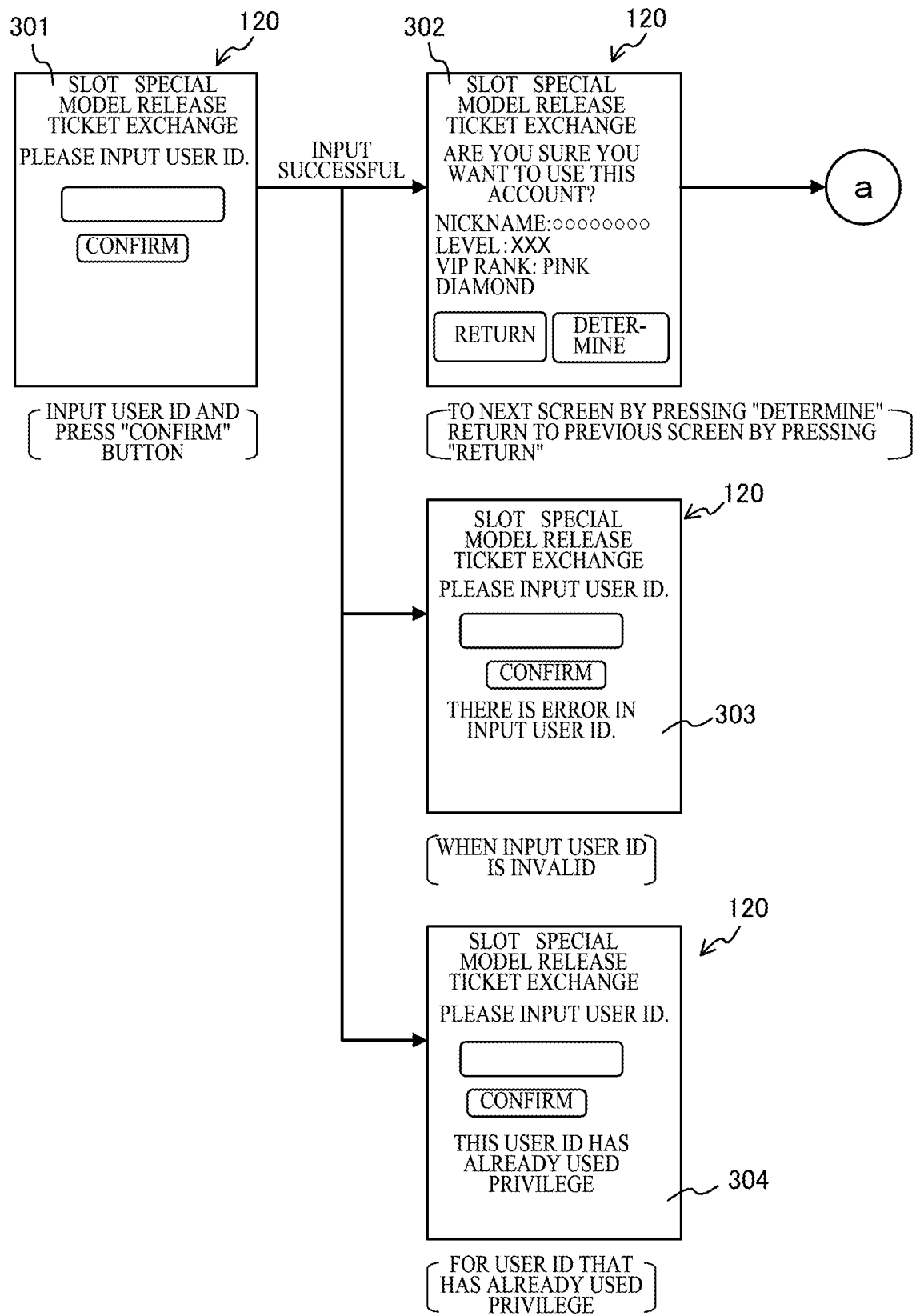
FIG. 8 is a schematic diagram showing a display example of the smartphone according to the embodiment of the present invention.
Figure 9:
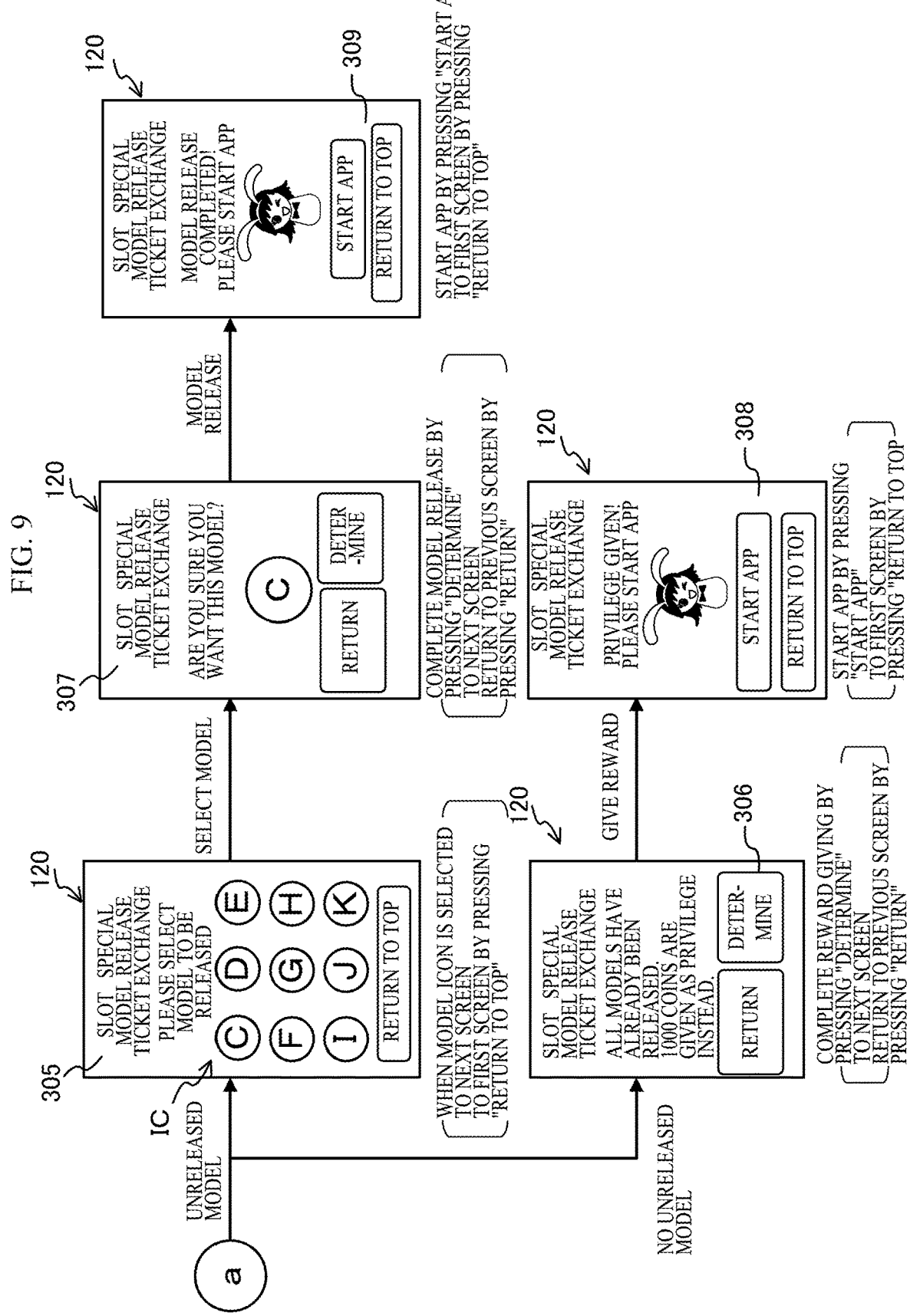
FIG. 9 is a schematic diagram showing a display example of the smartphone according to the embodiment of the present invention.

Display examples on the display 120 of the smartphone 1 relating to the above privilege giving process are shown in FIG. 8 and FIG. 9. When the player receives the two-dimensional bar code provided at the hall and images the two-dimensional bar code by the smartphone 1 to access a two-dimensionally barcoded uniform resource locator (URL), a user ID input request screen 301 for requesting input of the user ID is displayed on the display 120. When the player inputs his/her user ID according to this screen, an account information display screen 302 for displaying account information corresponding to the user ID is displayed on the display 120. It should be noted that when the user ID input by the player is not registered, the smartphone 1 displays an error screen 303 on the display 120. The player inputs the user ID again.

In addition, when the player has already received the privilege (release of an unreleased model or an alternative privilege), a screen 304 indicating that the privilege has been used is displayed on the display 120.

When the input user ID is correct and the privilege has not been used, an unreleased model selection screen 305 (FIG. 9), on which an unreleased model that can be selected by the player is displayed by an icon, is displayed on the display 120. In the display example of FIG. 9, nine models each displayed by an icon IC are unreleased models, and any one of the nine models can be selected as a release target as the privilege. It should be noted that although the count of icons displayed on one screen of the display 120 is nine, it is possible to display ten or more icons by scrolling the screen. The player can perform selection input by selecting a desired model from these icons and selecting and operating a corresponding icon on the touch panel 5.

For example, when the unreleased model "C" is selected, only the icon of the selected unreleased model "C" is displayed on the display 120 as a selection content confirmation screen 307. By the player operating a "determine" icon on this selection content confirmation screen 307, the selected model is determined as a model to be released as the privilege, and a selection result is transmitted to the server 10 as the release model selection information and is added to the released model in the user management table (FIG. 5) of the server 10.

In the smartphone 1, after the desired model is released, the game application is started, and a corresponding model on a casino mode model list screen is tapped and then application data of the model is downloaded, whereby, for example, it is possible to perform only model release at the hall of the game exhibition and then download the application data of the model in a Wi-Fi environment such as at home. Accordingly, the player can immediately play the model released as the privilege even though a predetermined condition is not cleared in the progress of the game.

On the other hand, when all the models have been released and there is no selectable unreleased model, the smartphone 1 displays an alternative privilege information display screen 306 on the display 120 in response to receiving the alternative privilege data from the server 10. A content of the alternative privilege (for example, awarding a predetermined coin as a privilege) provided instead of the release of the unreleased model is displayed on the alternative privilege information display screen 306. When the player accepts the displayed content of the alternative privilege, by the player operating the "determine" icon in the alternative privilege information display screen 306, data such as the count of coins managed in the user management table (FIG. 5) of the server 10 is transmitted to the smartphone 1. As a result, an alternative privilege giving screen 308 indicating that the selected alternative privilege has been given is displayed on the display 120 of the smartphone 1. The content of the alternative privilege and a "start app" icon for starting the application are displayed on this screen. By the player operating this icon, a process for enabling the alternative privilege stored in the smartphone 1 to be used in the game application is executed, and the player can use, in the game, the coin, item or the like given by the privilege.

Figure 10:
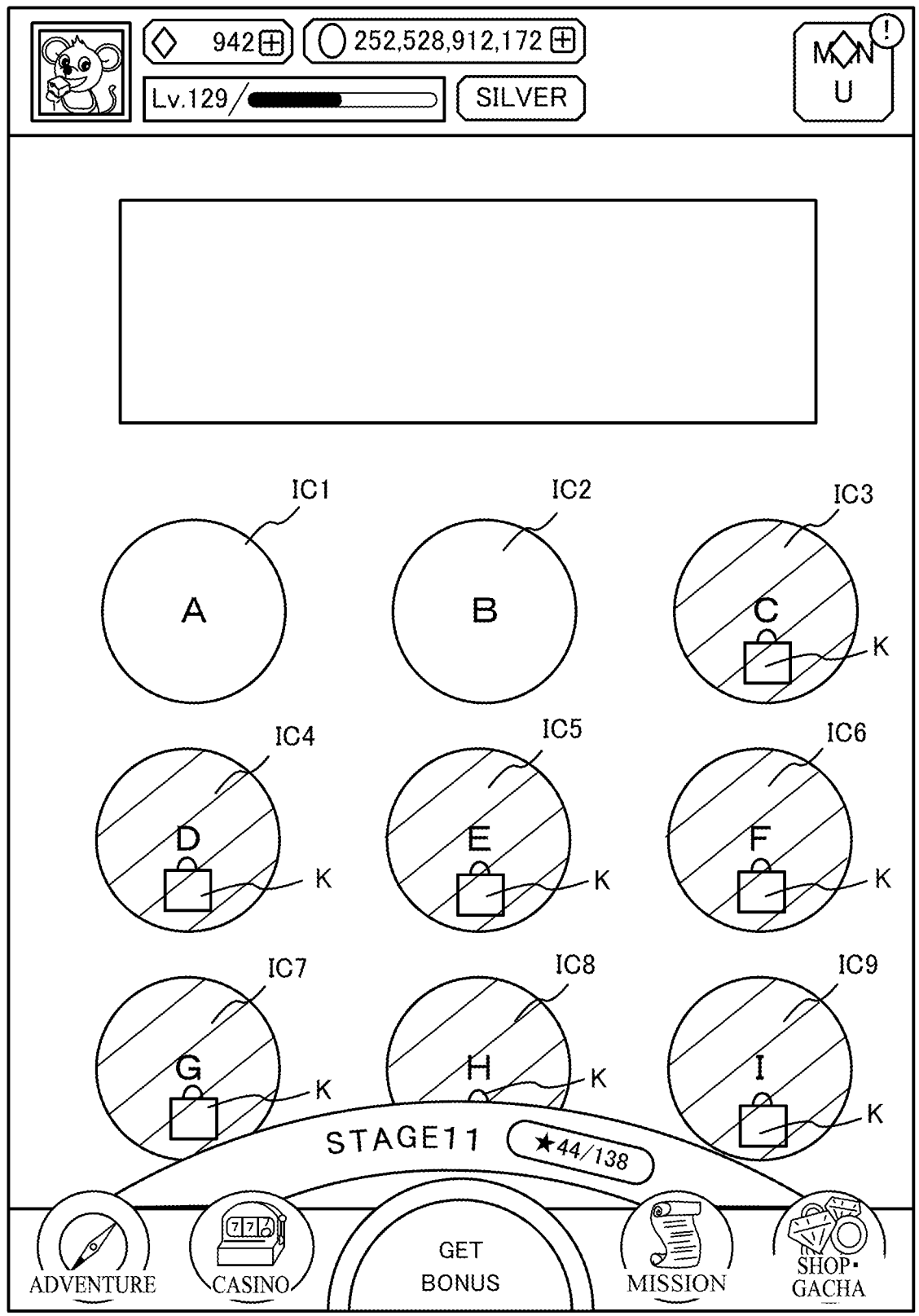
FIG. 10 is a schematic diagram showing a display example (casino mode) of the smartphone according to the embodiment of the present invention.

As shown in FIG. 10, when a casino mode is selected on the display 120 of the smartphone 1, icons IC1 and IC2 representing the playable released models (for example, model A and model B) and icons IC3, IC4, . . . representing the unreleased models that cannot be played (for example, model C, model D, . . . ) are distinctively displayed. For example, the key mark K is displayed on the unreleased model, while the key mark K is not displayed on the released model, and the icon itself is displayed brighter than the icon of the unreleased model.

Figure 11:
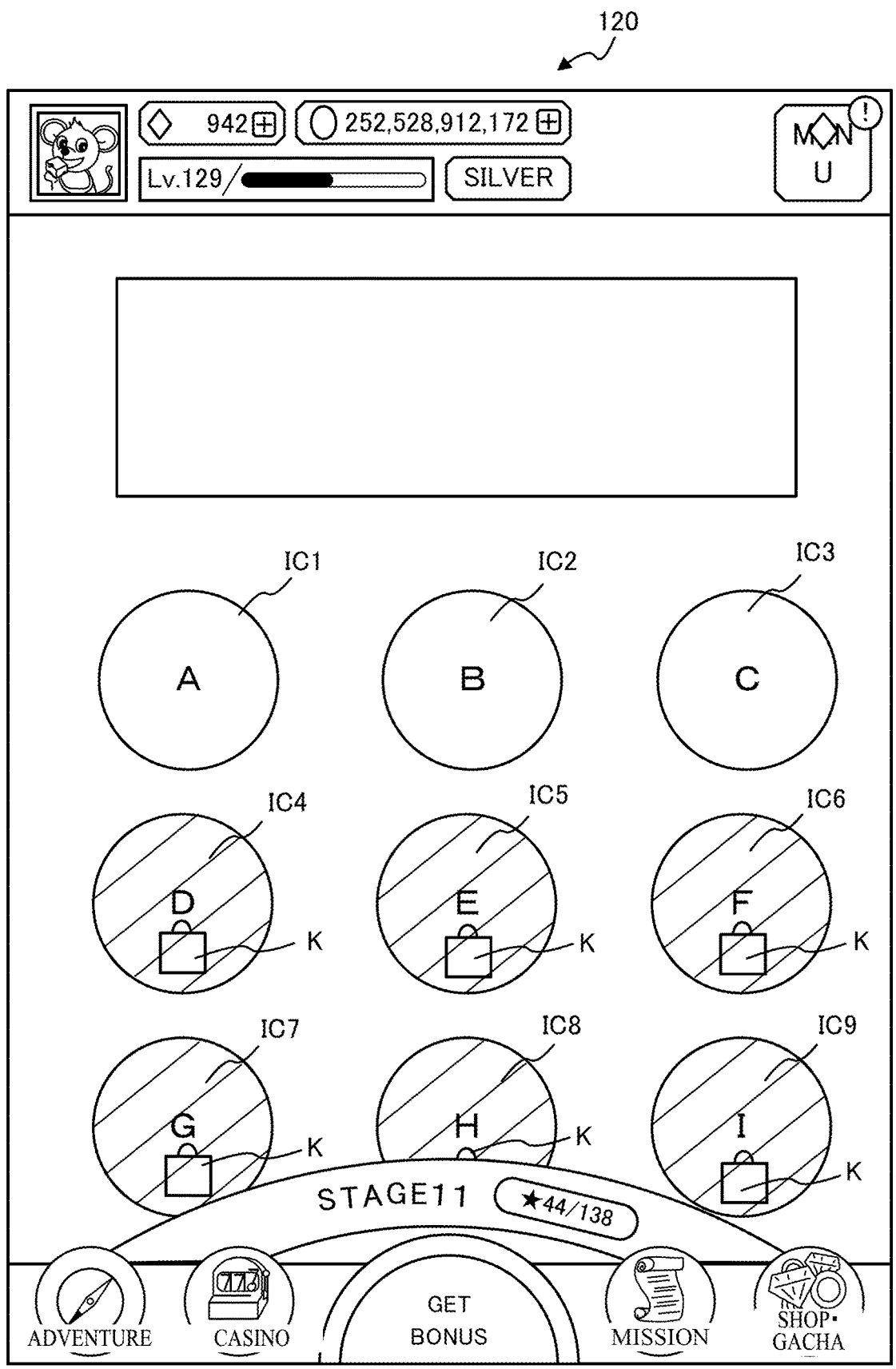
FIG. 11 is a schematic diagram showing a display example (casino mode) of the smartphone according to the embodiment of the present invention.

In this state, for example, when the model C is released as the visit privilege and an application of the model C is downloaded, the key mark K disappears from the icon IC3 of the model C and the icon IC3 is displayed brightly as shown in FIG. 11. Accordingly, the player can recognize that the model C has been released. It should be noted that the icon IC3 representing the model C released by the privilege may be displayed in a display mode different from those of the icons IC1 and IC2 representing other released models (for example, a mode of changing a color).

Other Embodiments

In the above embodiment, the case where the unreleased model is released by adding a corresponding model in the user management table (FIG. 5) to the released model based on the release model selection information or the alternative privilege determination information selected as a privilege from the smartphone 1, then by the player operating the smartphone 1 at a desired timing, the game application is started, and by the player tapping a corresponding release model from the model list display in the casino mode, the data of the unreleased model is downloaded has been described. However, the present invention is not limited thereto, and for example, in response to the server 10 receiving, from the smartphone 1, the selection result of the unreleased model (release model selection information) by the player, the data of the selected model may be immediately downloaded to the smartphone 1.

Further, in the above embodiment, the privilege giving process in the game of sequentially clearing quests while executing the slot game as the game content has been described. However, the present invention is not limited thereto, and the present invention can be applied even when various other game contents are provided.

Further, in the above embodiment, the case where when there is no unreleased model, a predetermined count of coins is given as the alternative privilege has been described. However, the present invention is not limited thereto, and for example, various items used to advance the game such as items referred to as gems in the game, items required to advantageously advance the game, which are usually only available for a fee in the game can be given as the alternative privilege.

The slot game executed in the above embodiment may be installed and executed, as game software (a program, game data), in an information processing device such as a portable information device other than the above smartphone, a portable computer or a laptop computer, a notebook personal computer, a tablet personal computer, a handheld personal computer, and a personal data assistant (PDA). In this case, the game software executing the slot game is downloaded from a server or the like by a communication unit and stored in a storage device (flash memory or the like) in the portable information device. It should be noted that the communication unit may be a transmission line capable of bidirectional communication such as the Internet and a cable television, or may be a broadcast transmitting information in only one direction.

Further, the game software executing the game according to the embodiment may be stored in a storage medium such as a CD-ROM, a DVD-ROM, a magneto-optical disc (MO), a hard disk, and a flash memory, and may be read from the storage medium as needed and installed in the storage device in the information processing device such as the smartphone 1.

Further, the description content in the above embodiment may be implemented as a game program executed between each smartphone (information processing device) 1 and the server 10 via the Internet (communication line). In this case, the CPU 101 of the smartphone 1 and the CPU 1101 of the server 10 function as a controller of the game system 100 including the smartphone 1 and the server 10. Further, in this case, the game program may be stored in a storage medium such as a CD-ROM, a DVD-ROM, a magneto-optical disc (MO), a hard disk, and a flash memory, and may be read from the storage medium as needed.

Further, the game program executed in the above embodiment may be stored in a storage medium (MEDIUM).

Although the embodiments of the present invention have been described above, only specific examples are exemplified, the present invention is not particularly limited, and a specific configuration of each unit or the like can be appropriately changed in design. In addition, the effects described in the embodiments of the present invention are merely listed as the most preferred effects arising from the present invention, and the effects according to the present invention are not limited to those described in the embodiments of the present invention.

REFERENCE SIGNS LIST

1: smartphone (information processing device)
5: touch panel
10: server
21: symbol display area
24: operation display area
101, 1101: CPU
102, 1102: ROM
103, 1103: RAM
104: flash memory
112: camera
120: display
1104: storage device

The invention claimed is:

1. An information processing system comprising:
an information processing device configured to release any one of a plurality of contents to be executable in response to satisfying a predetermined condition by execution of a released content; and
a server communicably connected to the information processing device, wherein
the server includes:
a storage unit configured to store a user identifier (ID) transmitted from the information processing device and one or more unreleased contents associated with the user ID; and
a control unit configured to:
refer the one or more unreleased contents that are stored in the storage device and associated with the user ID, based on access information transmitted from the information processing device and the user ID, to cause the information processing device to display the one or more unreleased contents associated with the user ID, and
based on release selection information indicating a selection of a user received from the information processing device, change an unreleased content selected by the user among the one or more unreleased contents from unreleased to released.

2. A management program executed by a server communicably connected to an information processing device configured to release any one of a plurality of contents to be executable in response to satisfying a predetermined condition by execution of a released content, and comprising a storage device configured to store a user identifier (ID) transmitted from the information processing device and one or more unreleased contents associated with the user ID, the management program executing:
a process of referring the one or more unreleased contents that are stored in the storage device and associated with the user ID, based on access information transmitted from the information processing device and the user ID, to cause the information processing device to display the one or more unreleased contents associated with the user ID; and
a process of, based on release selection information indicating a selection of a user received from the information processing device, changing an unreleased content selected by the user among the one or more unreleased contents from unreleased to released.

* * * * *